(12) United States Patent
Garcia

(10) Patent No.: US 9,838,364 B2
(45) Date of Patent: *Dec. 5, 2017

(54) MEDIA STORAGE AND PLAYBACK OF ENCRYPTED CONTENT

(71) Applicant: Comcast Cable Communications, LLC, Philadelphia, PA (US)

(72) Inventor: Maurice Garcia, Levittown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/202,791

(22) Filed: Jul. 6, 2016

(65) Prior Publication Data

US 2017/0054698 A1 Feb. 23, 2017

Related U.S. Application Data

(63) Continuation of application No. 13/150,934, filed on Jun. 1, 2011, now Pat. No. 9,419,947.

(51) Int. Cl.
*H04L 29/06* (2006.01)

(52) U.S. Cl.
CPC ...... *H04L 63/0485* (2013.01); *H04L 63/0428* (2013.01)

(58) Field of Classification Search
CPC ............ H04L 63/0485; H04N 21/2347; H04N 21/2351; H04N 21/442
See application file for complete search history.

(56) References Cited

U.S. PATENT DOCUMENTS

| | | | |
|---|---|---|---|
| 5,826,165 | A | 10/1998 | Echeita et al. |
| 2003/0046686 | A1 | 3/2003 | Candelore et al. |
| 2004/0244030 | A1 | 12/2004 | Boyce et al. |
| 2005/0187966 | A1 | 8/2005 | Iino |
| 2007/0220575 | A1 | 9/2007 | Cooper et al. |
| 2007/0230904 | A1 | 10/2007 | Billbrey |
| 2007/0276925 | A1 | 11/2007 | La Joie et al. |
| 2010/0333130 | A1 | 12/2010 | Peterson |

*Primary Examiner* — Ellen Tran
(74) *Attorney, Agent, or Firm* — Banner & Witcoff, Ltd.

(57) ABSTRACT

A content distribution system is disclosed that supports verification of transmission. In some embodiments, a remote probe device captures content and sends the content to a decrypting device so that decryption may be performed. The decrypting device may archive the content and may subsequently send the content to the probe device or to a playback device so that the content may be displayed. Consequently, the content distribution system can verify that specified content (e.g., an advertisement) was correctly distributed according to scheduled information.

20 Claims, 10 Drawing Sheets

MEDIA STORAGE AND PLAYBACK OF ENCRYPTED CONTENT

CROSS-REFERENCE TO RELATED APPLICATIONS

This application is a continuation of U.S. application Ser. No. 13/150,934 filed on Jun. 1, 2011 and entitled "MEDIA STORAGE AND PLAYBACK OF ENCRYPTED CONTENT."

TECHNICAL FIELD

Aspects of the disclosure relate to storage and playback of encrypted data or media content in a content access or distribution system to verify transmission of the encrypted data or media content.

BACKGROUND

Many operators provide media as well as high speed interne access, video on demand (VOD), Voice over IP (VoIP) telephone, and numerous other services to end-users. To provide such services, system operators must manage and maintain increasingly complex networks. FIG. 1 depicts a block diagram showing an example of such a network. A national or general processing center 101 (e.g., a central office or headend) may include elements such as VOD servers, servers for receiving and encapsulating programming content, management servers, and the like. Processing center 101 communicates with multiple regional processing centers 103 over a backbone network 105, with regional processing centers 103 also including facilities for VOD and programming reception/encapsulation. Each regional processing center 103 communicates over a regional access network 107 with multiple hubs 109. Each hub 109 includes a termination system, devices for quadrature amplitude modulation/demodulation (QAM), and other elements for transmission and reception of information.

From hubs 109, individual homes or other end-user locations are reached via an end-user distribution network 111, which may comprise, for example, an optical fiber, wireless, or a hybrid fiber coaxial cable (HFC) access network. A fiber optic portion 113 of end-user distribution network 111 may include multiple nodes 117. A transmission line portion 115 of end-user distribution network 111 may include feeder lines 119 extending from nodes 117. Drop end-user lines 121 typically extend from taps in feeder lines 119 and connect to the end-user premises. Amplifiers are often distributed along the feeder lines. Alternating current (AC) power may also be input into the feeder cables so as to provide a power source for the amplifiers. For simplicity, FIG. 1 only shows a very small part of transmission line portion 115 of an end-user distribution network associated with a single node. Typically, distribution plants 123 associated with hubs may be the largest part of the system, and there may be many end-users receiving service through a particular hub.

Communication through a transmission line may be affected in many ways. For example, temperature changes can affect signal quality in transmission lines. To detect, prevent and correct communication problems, signal quality measurements from the transmission line part of an end-user distribution network can be very useful in assessing transmission quality. In addition, a media distribution operator may need to verify that specific media content is delivered to end users in accordance with schedule information, for example, in order to meet contractual obligations.

BRIEF SUMMARY

The following presents a simplified summary of the disclosure in order to provide a basic understanding of some aspects. It is not intended to identify key or critical elements of the disclosure or to delineate the scope of the disclosure. The following summary merely presents some concepts of the disclosure in a simplified form as a prelude to the more detailed description provided below.

In one aspect, a content distribution system supports verification of encrypted transmissions through the content distribution system using a probe controller, at least one remote probe/playback device, and a decrypting device. A remote probe device captures encrypted content and sends the encrypted content to the decrypting device so that decryption may be performed by the separately located decrypting device. The decrypting device may archive the resulting decrypted content and subsequently send the decrypted content to the same probe device or to a different playback device so that the decrypted content may be displayed. Consequently, the content distribution system can verify that specified content (e.g., an advertisement) was correctly distributed according to scheduled information.

In another aspect of the disclosure, encrypted content from a plurality of probe devices is sent to the decrypting device and is stored at the decrypting device for subsequent retrieval for display at a playback device. The decrypting device may be configured by a conditional access server to decrypt encrypted content using a current decryption key in accordance with an encryption scheme supported by a content distribution system.

The foregoing and other embodiments can be partially or wholly implemented on a computer-readable medium, for example, by storing computer-executable instructions or modules, or by utilizing computer-readable data structures.

The details of these and other embodiments are set forth in the accompanying drawings and the description below. Other features and advantages of the disclosure will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

Traditional systems often require playback equipment to monitor transmitted media content in a distribution system. The playback system provides an output from a gateway (e.g., a settop box) that decrypts the received transmission when the transmission is encrypted. The gateway may be connected to an auxiliary apparatus (e.g., a sling box) that retransmits the decrypted transmission via the Internet or Intranet using an Internet Protocol (IP) to a remote viewer. With some traditional systems, a video catcher may be used to convert a transmission (e.g., IP or USB) received through a content distribution system to a modulated signal (e.g., quadrature amplitude modulation (QAM)) for a video display when the video is not encrypted. Moreover, traditional systems are typically not scalable and are often expensive, single use devices that do not comply with standards.

Aspects of the disclosure provide a capability to verify encrypted transmissions through a content distribution system using a remote probe/playback device and a decrypting device. In an embodiment, a remote probe device may capture encrypted content and send the encrypted content to the decrypting device for decryption. The decrypting device may archive the resulting decrypted content and subsequently send the decrypted content to the same probe device or to a different playback device so that the decrypted content may be displayed. Consequently, the content distribution system may verify that specified content (e.g., an advertisement) was correctly distributed according to scheduled information.

In some embodiments, a playback device may verify that the decrypted content is substantially the same (i.e., matches) as the expected content (e.g., a scheduled advertisement).

Figure 1:
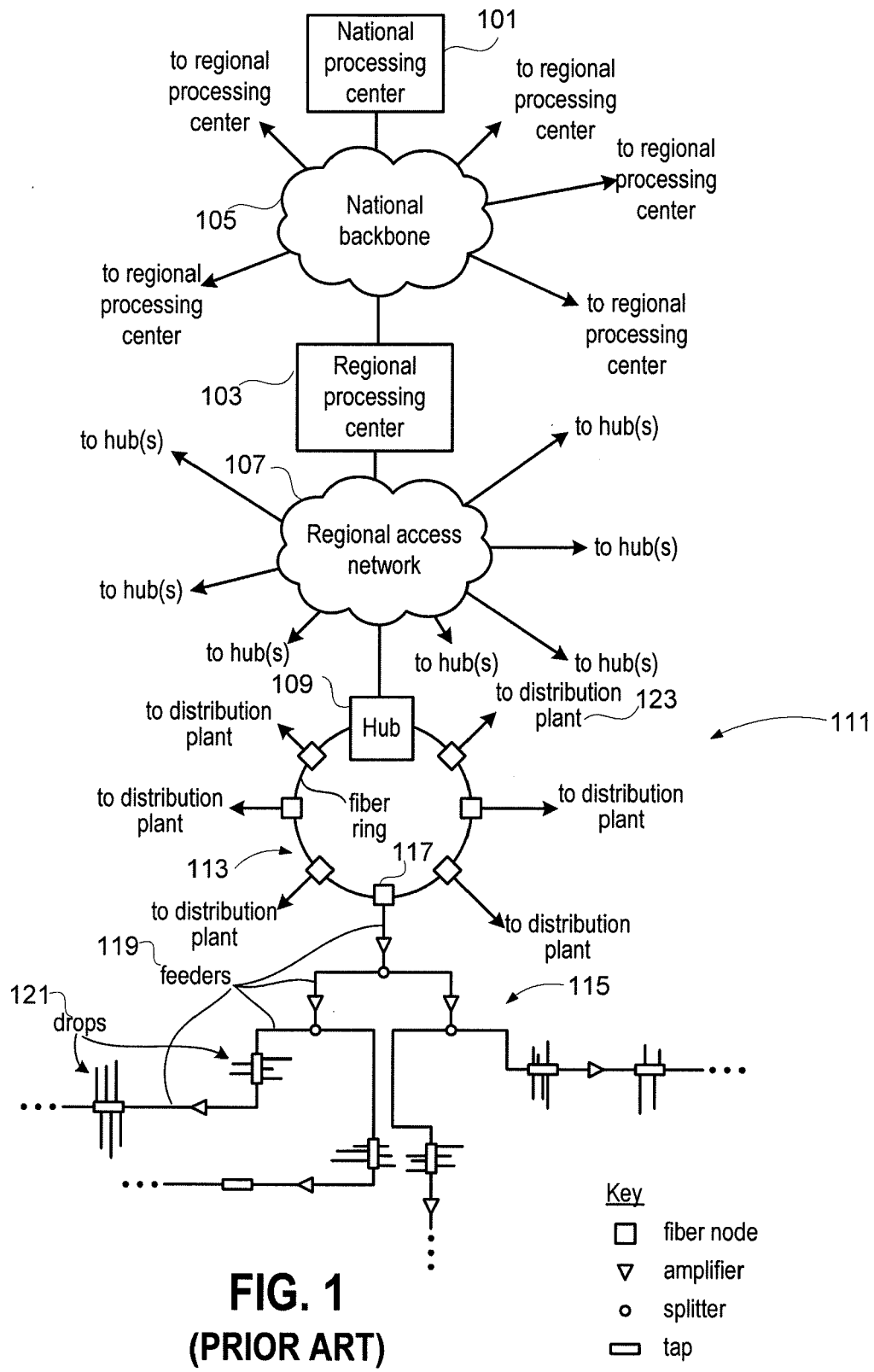
FIG. 1 shows a block diagram showing selected elements of a media distribution network according to prior art.
Figure 2:
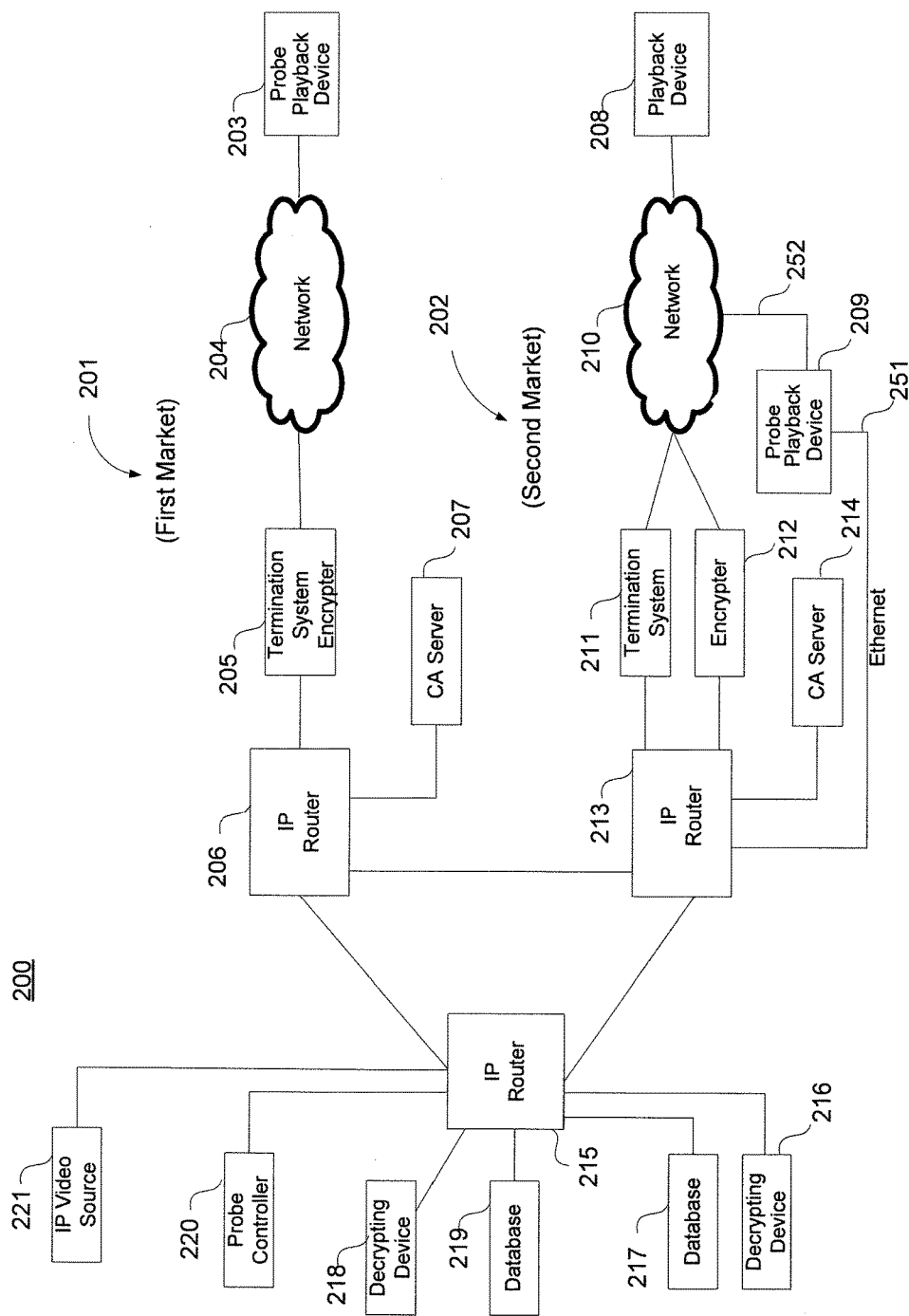
FIG. 2 shows a content distribution system for capturing and analyzing media content in accordance with some aspects of the disclosure.

FIG. 2 shows content distribution system 200 for monitoring/capturing and analyzing media content in accordance with aspects of the disclosure. In some embodiments, the content distribution system 200 supports first market (e.g., IP video, voice, and/or data) 201 and second market 202. Media content may originate from content source 221 and is distributed to end-user devices (not explicitly shown) over IP routers 215, 206, and 213. In second market 202, the content may be distributed through termination system 211 or encrypter 212 (when the content is to be encrypted) and through distribution network 210. Distribution network 210 may be a hybrid fiber-coaxial (HFC) network, digital subscriber line (DSL) network, satellite transmission network, wireless network, optical fiber network, or any other type of network. In first market 201, content may be distributed through termination system/encrypter 205 and network 204. Embodiments may support different types of networks 204 as discussed above. For example, network 204 may comprise a distribution or an access network.

Distributed content may be captured by probe/playback device 203 in first market 201 and by probe/playback device 209 in second market 202. After content has been collected by a probe device 203 or 209, the probe device may send the content to decrypting device 216 or 218 through one or more of IP routers 206, 213, and 215, either as illustrated in FIG. 2 or via a more direct path, so that encrypted content can be decrypted in accordance with the scheme being used. (For example, probe device 203 or 209 may collect content by receiving, processing, and storing the content.) For example, if markets 201 and 202 use different encryption schemes, decrypting device 218 may be associated with market 201 and decrypting device 216 may be associated with market 202. However, with some embodiments, the same encryption/decryption scheme may be used for both markets 201 and 202. In such a case, only one decrypting device may be used or both decrypting devices 216 and 218 may be used in order to distribute tasks to enhance decryption performance.

Decrypting devices 216 and 218 may be configured to store media content on databases 217 and 219, respectively. For example, decrypting device 216 may store portions of encrypted content received from probe/playback device 209 if the decrypting device cannot decrypt the encrypted content in real-time. Also, decrypting device 216 may store decrypted content on database 217, for example, until instructed to retrieve the decrypted content by a playback device. Decrypting device 216 or 218 may receive encrypted content that is decrypted and subsequently stored. However, with some embodiments decrypting device 216 or 218 may also receive unencrypted content that is stored in an associated database and that may be later retrieved if requested by a playback device.

While devices 203, 208, and 209 may support both probing (collecting) distributed content and playing back content, devices 203, 208, and 209 may also support only one of the two functions or additional functions. For example, device 209 may collect encrypted content and instruct decrypting device 216 to decrypt encrypted content, which is stored on database 217. Playback device 208 may then request the decrypted content from decrypting device 216. Consequently, device 216 may retrieve the decrypted content and send the content to playback device 208 for viewing.

A business that is purchasing advertisement time with a content provider may request that the provider verify that the advertisement was transmitted when and where the business expected it to be. An entity may also wish to verify that an application or another type of data transmission was actually transmitted and/or received when and where that entity expected. Verification may be expanded to have a login procedure so that the business or business may view the content for themselves (e.g., through playback device 208) to ascertain that their advertisement or other data was transmitted.

Content distribution system 200 may verify the scheduled transmission and delivery of different types of content or data, including advertisements and video on demand, in accordance with schedule information. Verification of content delivery may ascertain that a service was successfully completed so that customer (e.g., advertiser or end-user) is obligated to pay for the service. Consequently, both customer satisfaction as well as revenues to the content provider may be enhanced. Verification may be based on the scheduled quantity and/or quality of the delivered content as well as the timeliness of the delivery. For example, verification may ascertain that specific content/data was successfully delivered with a measured number of bits and a measured error rate within a scheduled time duration.

In some embodiments, characteristics such as transmission quality may be assessed from transmission parameters maintained at a probe device (e.g., device 203), or an associated device, that are indicative of the quality of the received signal at the probe device. The transmission parameters may be later retrieved and evaluated to assess the transmission quality.

In some embodiments, device 209 has the ability to playback various types of data or content such as a video stream/packet identifier (PID) or group of video streams (e.g., Multiprogram Transport Stream (MPTS)) via either through local connection 251 (e.g., Ethernet, wireless, Bluetooth, Universal Serial Bus (USB), and the like) or through network return 252 (e.g., Data Over Cable Service Interface Specification (DOCSIS 3.0)). If the captured content is encrypted, device 209 may send the encrypted content to decrypting device 216 through Ethernet connection 251, network return 252, or another type of communication link. Sending the encrypted content over Ethernet connection 251 may be advantageous because distribution network 210 is circumvented. Similarly, decrypted content may be sent to device 209 through connections 251 or 252 so that the content may be remotely viewed.

In some embodiments, decrypting devices 216 and 218 may be authorized, having correct entitlements, to decrypt media content by the conditional access (CA) servers 214 and 207, respectively, from a network, such as the Region/Market/Optical Transport Network (OTN), that is associated with the source (e.g., IP source 221) of the media stream.

With some embodiments, decryption devices 216 or 218 may comprise an array of circuit cards or downloadable security software as the mechanism to decrypt the media streams. Decryption may be configured to support the associated encryption/decryption scheme with the current decryption key. However, decrypting devices 216 or 218 may be subsequently reconfigured to have a different decryption key or to support a different encryption scheme. Consequently, decrypting devices 216 or 218 may support one or more decryption keys at a particular instance of time to support one or more encryption schemes or may be reconfigured to support a different encryption scheme at a subsequent time.

Figure 3:
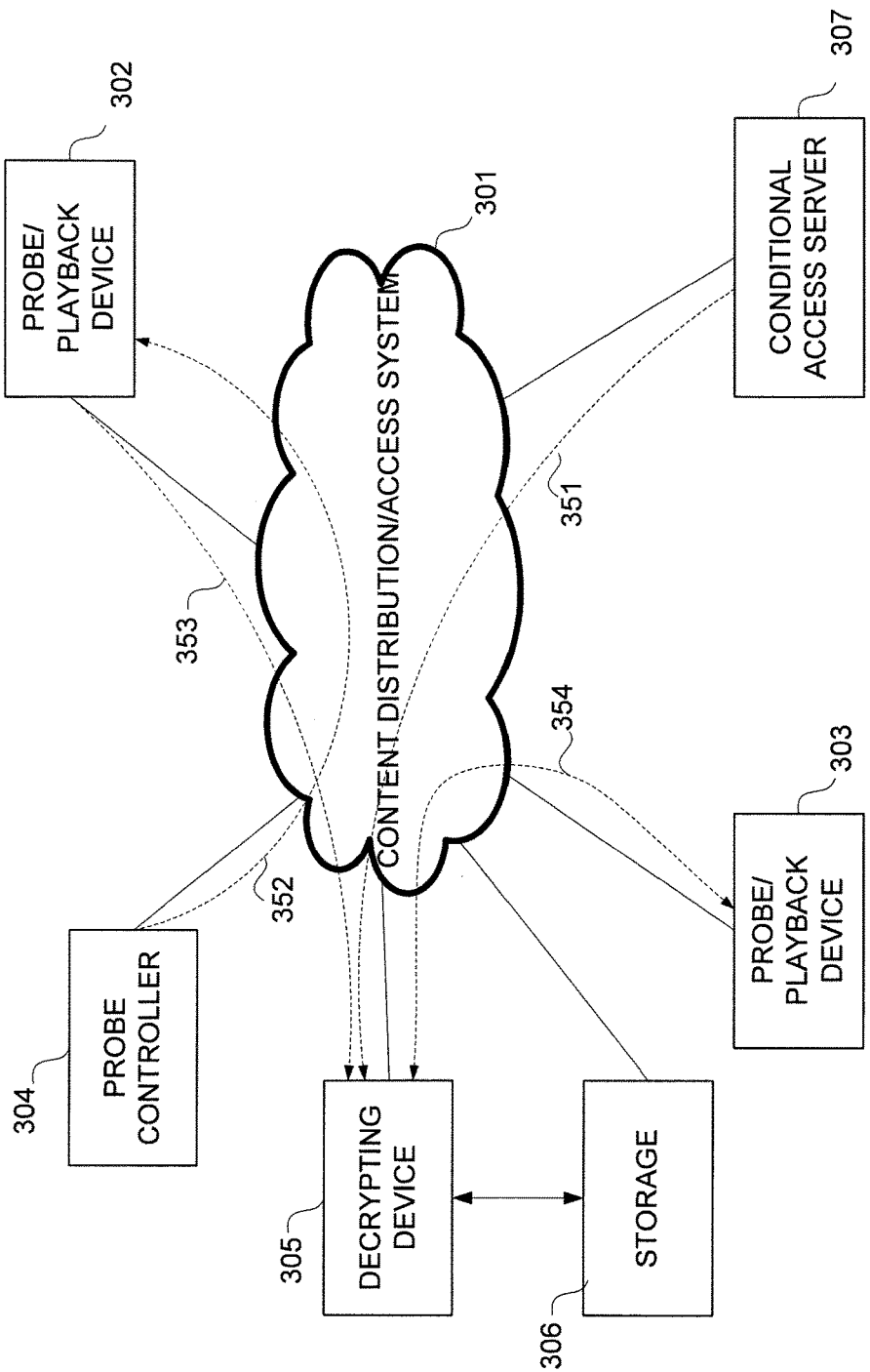
FIG. 3 shows communications between elements in a content distribution system in accordance with some aspects of the disclosure.

FIG. 3 shows communications between elements in a content distribution system in accordance with aspects of the disclosure. In order to configure decrypting device 305, conditional access server 307 may authorize decrypting device 305 to decrypt encrypted content from probe/playback devices along content distribution system 301 by providing the current decryption key (which may include, for example, a lifetime of the current decryption key) during connection session 351.

A probe controller 304 may instruct probe/playback device 302 to capture distributed content that is distributed by content distribution system 301 or other sources. Probe controller 304 may instruct device 302 or device 303 over connection 352 or 354, respectively, to tune to a specified channel or a specified group of media streams and obtain stream components associated with specified packet identifiers (PIDs). Controller 304 may further specify, for example, a start time and stop time and/or time duration. The captured content may be time stamped and stored in storage and subsequently sent to decrypting device 305 over connection 353, for example, after the scheduled stop time. In some embodiments, the captured content may be decrypted before being stored in media storage.

Decrypting device 305 may decrypt the received encrypted content and archive the decrypted content in storage 306. In some embodiments, storage 306 may be co-located with decrypting device 305 or may be located in a separate location. When decrypting device 305 and storage device 306 are separate entities or in separate locations, device 305 may interact with device 306 through content distribution system 301 or through separate communication facilities, e.g., a direct Ethernet or wireless connection.

Figure 4:
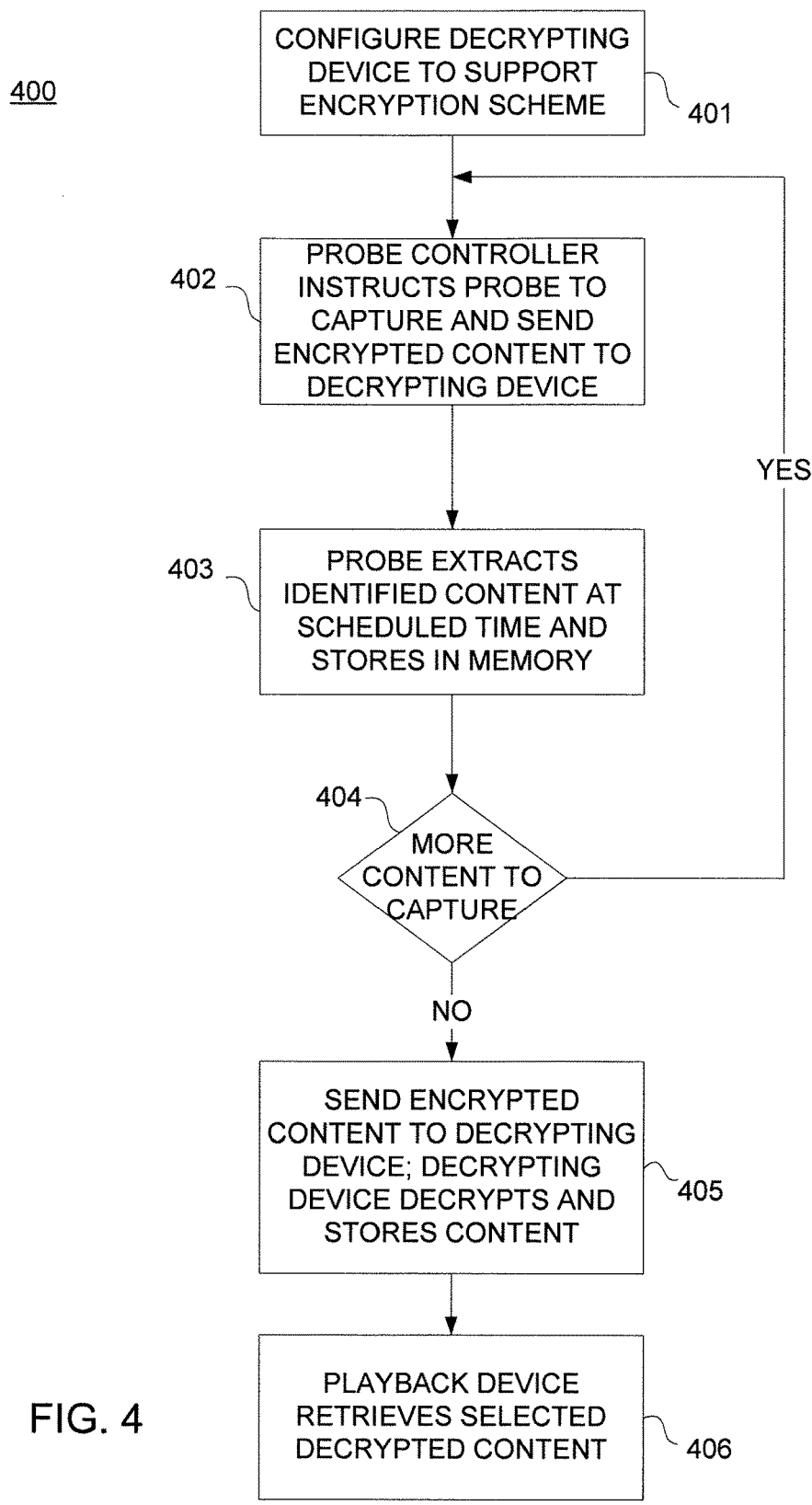
FIG. 4 shows a flow chart for a process performed in a content distribution system in accordance with some aspects of the disclosure.

38 FIG. 4 shows flow chart 400 for an example of a process performed in content distribution system 200 in accordance with aspects of the disclosure. As previously discussed, content distribution system 200 may comprise content source 221, decrypting device 216, database 217, conditional access server 214, probe controller 220, and probe/playback device 209 as shown in FIG. 2.

At step 401 decrypting device 216 is configured, e.g., by conditional access server 214, to decrypt encrypted content in accordance with the encryption scheme supported by content distribution system 200. For example, server 214 may provide the current decryption key, which may be subsequently changed. With some embodiments, decrypting device 216 is statically configured to support only one encryption scheme and may be reconfigured to support a different encryption supported by content distribution system 200. However, with some embodiments, decrypting device 216 may support a plurality of encryption schemes if content distribution system 200 supports the plurality of encryption schemes or if decrypting device 216 decrypts content for a plurality of content distribution systems having different encryption schemes.

At step 402, probe controller 220 instructs a device, such as the probe/playback device 209, to capture encrypted content at, for example, a scheduled time or elapsed time into a piece of content. For example, device 209 may be instructed to tune to channel 20 from 8:03 to 8:05 pm and capture the data, e.g., video, component (associated with a particular PID). For example, probe controller 220 may obtain schedule information based on scheduled advertisements. Probe/playback device 209 extracts the identified content, or data representing such content, according to the schedule information at step 403 and may store the captured content in a memory device.

Captured content, as captured by probe 209, may just be some data representative of that content, e.g., an entire advertisement need not be captured; rather some small amount of representative data may be captured.

At step 404 probe/playback device 209 determines if there is additional content (e.g., another advertisement) to capture. If so, probe/playback device 209 repeats steps 402 and 403. However, with some embodiments, probe/playback device 209 may send the captured content, or data representing such content, to decrypting device 216 without waiting to capture additional content.

When probe/playback device 209 has captured the content as instructed by probe controller 220, probe/playback device 209 sends the encrypted content to decrypting device at step 405. Decrypting device 216 then decrypts the content and stores the decrypted content in archive memory 217.

At step 406 probe/playback device 209 subsequently requests the decrypted content from decrypting device 216, which retrieves the content from archive memory 217. The content is then sent to probe/playback device 209 so that a user can view the content, or data representative of such content, to verify that the content is or was transmitted/consumed as required, for example, in accordance with the schedule information. However, the content may also be sent to non-probe devices, e.g., playback device 208.

Figure 5:
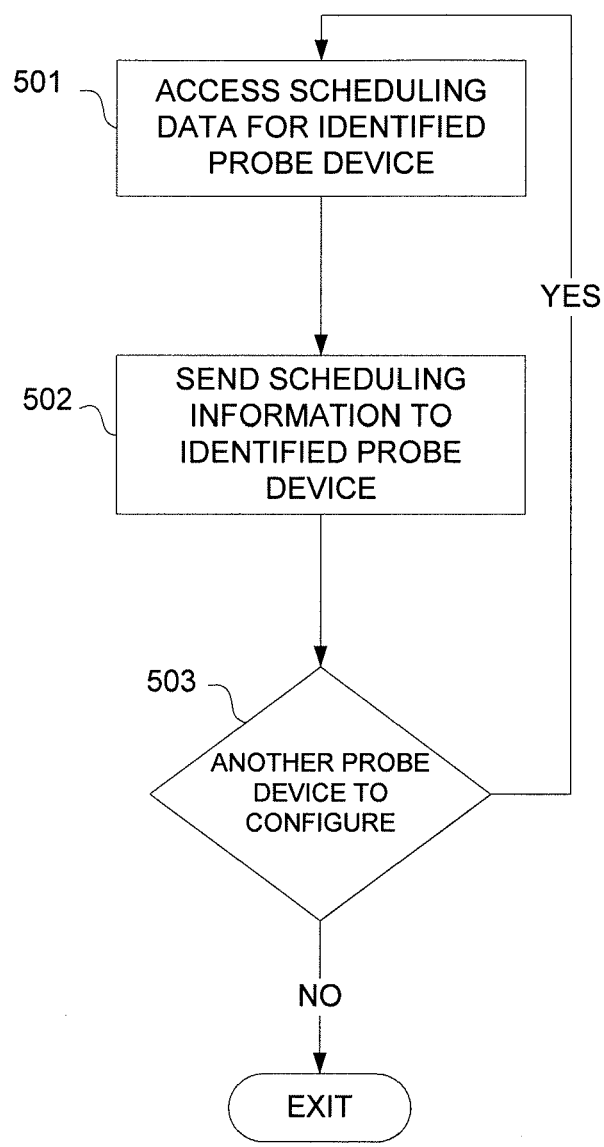
FIG. 5 shows a flow chart for a process performed at a probe controller in accordance with some aspects of the disclosure.
Figure 9:
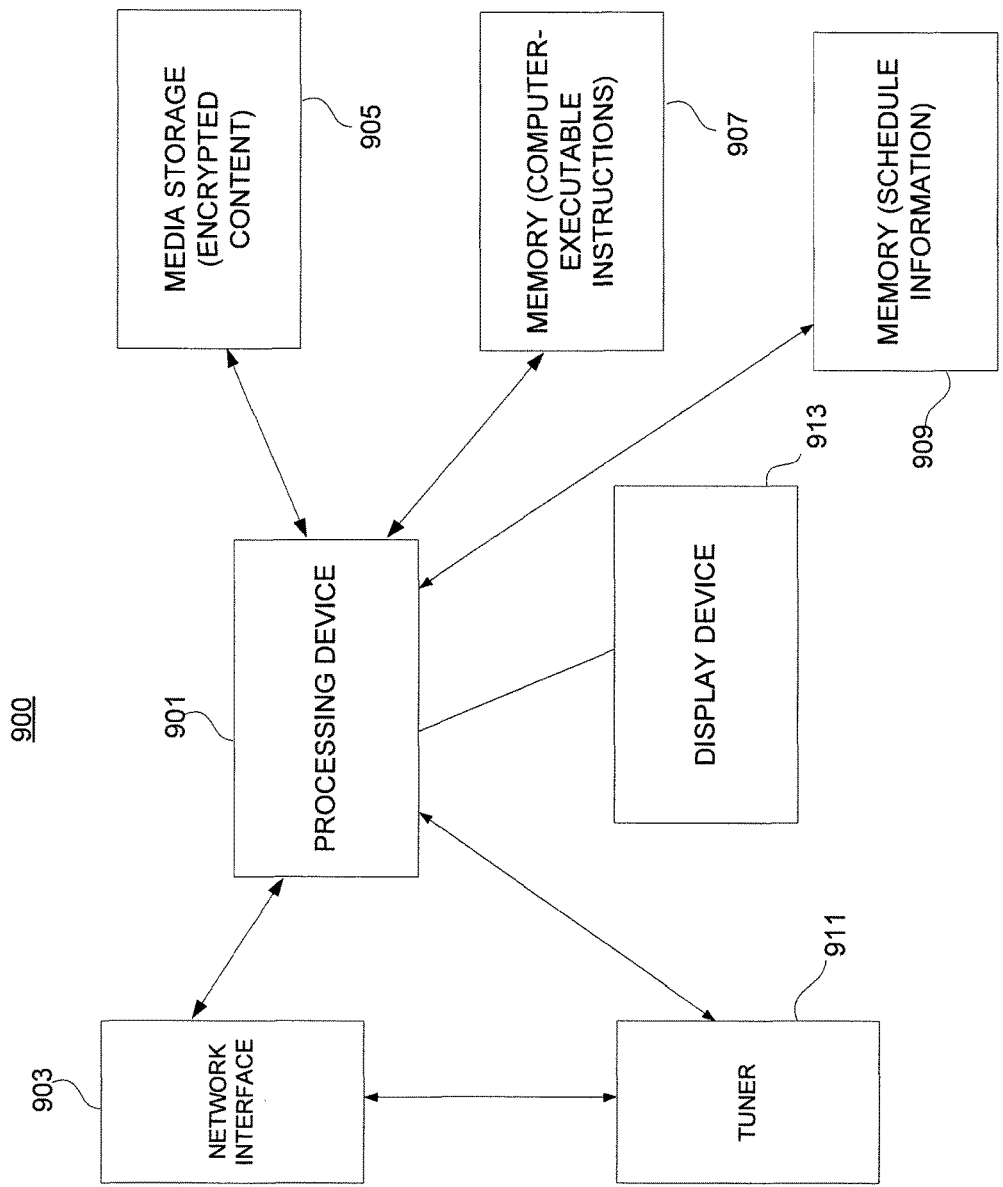
FIG. 9 shows an apparatus that supports a probe/playback device in accordance with some aspects of the disclosure.

FIG. 5 shows flow chart 500 for an example of a process performed at probe controller 220 in accordance with some aspects of the disclosure. At step 501, probe controller 220 accesses schedule information for instructing probe devices 203 and 209. The schedule information may often be updated by a service provider based on commitments with a content provider or an advertiser, and may be accessed from a memory device (e.g., memory 909 as shown in FIG. 9) or an input device.

At step 502, probe controller 220 sends the schedule information to the appropriate probe device (probe 203 and or probe 209) through distribution system 200 so that the probe device will capture encrypted content or associated data, at the instructed time and channel. The instructions may be sent though IP routers 215, 206, and 213 and through network 204, 210, or over a transmission facility (local connection 251) bypassing a distribution network. At step 503 probe controller 220 repeats steps 501 and 502 so that instructions are send to all appropriate probe devices.

Figure 6:
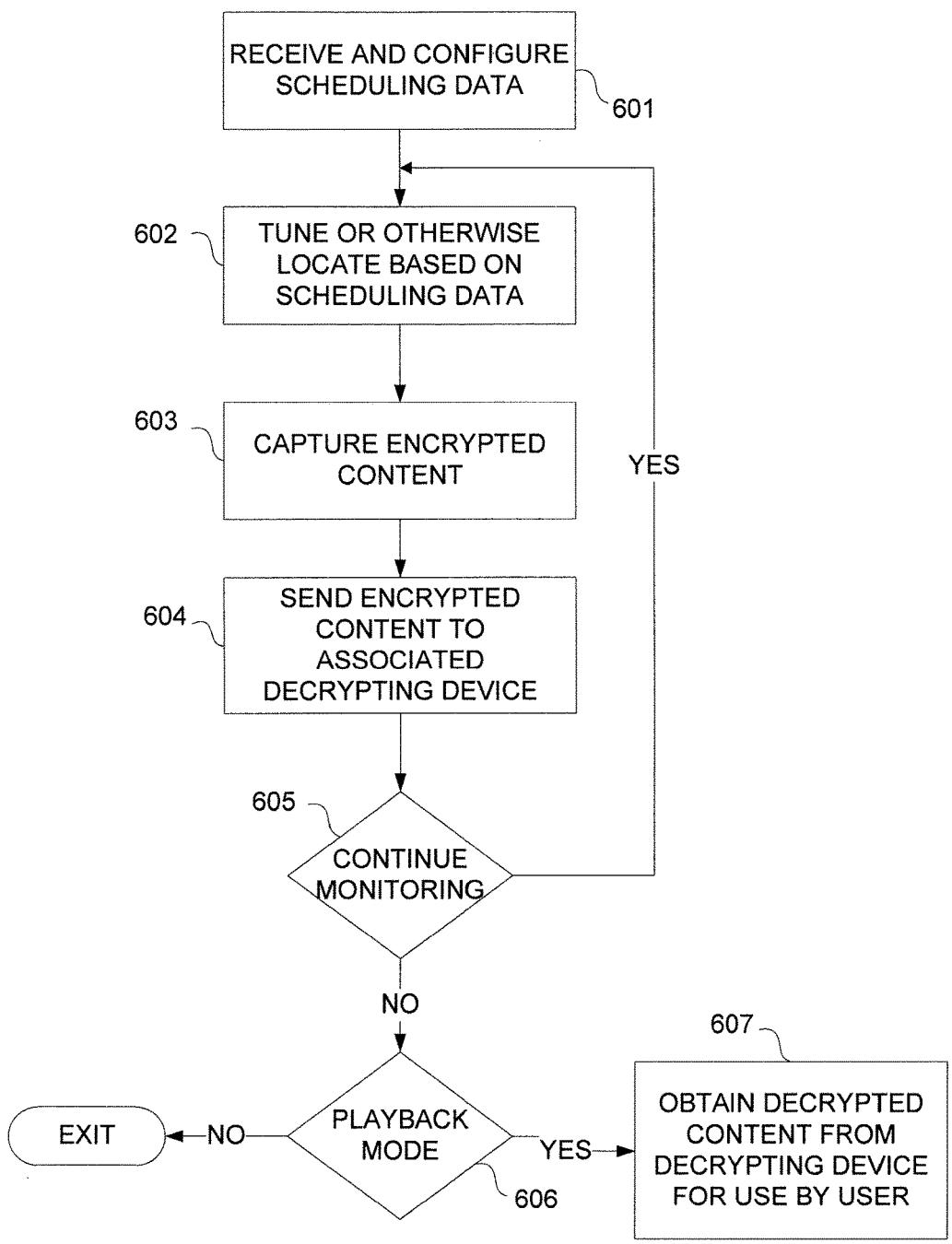
FIG. 6 shows a flow chart for a process performed at a probe/playback device in accordance with some aspects of the disclosure.

FIG. 6 shows flow chart 600 for an example process performed at a probe/playback device (e.g., device 209) in accordance with some aspects of the disclosure, where the content captured by the device is encrypted. At step 601 the probe device receives instructions to capture content based on schedule data from probe controller 220. Based on the schedule data, the probe device tunes to or otherwise locates content at step 602 in order to capture the content, which may be encrypted, at step 603. The probe device may store the captured content in memory (e.g., media storage 905 as shown in FIG. 9) and subsequently send the encrypted content to a decrypting device at step 604. However, with some embodiments, the probe device may send the captured content to the decrypting device as soon as the content has been captured to reduce storage requirements at the probe device. At step 605, the probe device repeats steps 602-604 when additional content is to be captured.

The probe device may also support playback capabilities as determined at step 606. If so, at step 607 the probe/playback device will subsequently request decrypted content from the associated decrypting device when instructed by a user so that the user can view the content for verification. However, with some embodiments, the encrypted content may be captured by one device and the corresponding decrypted content may be viewed on a different device.

Figure 7:
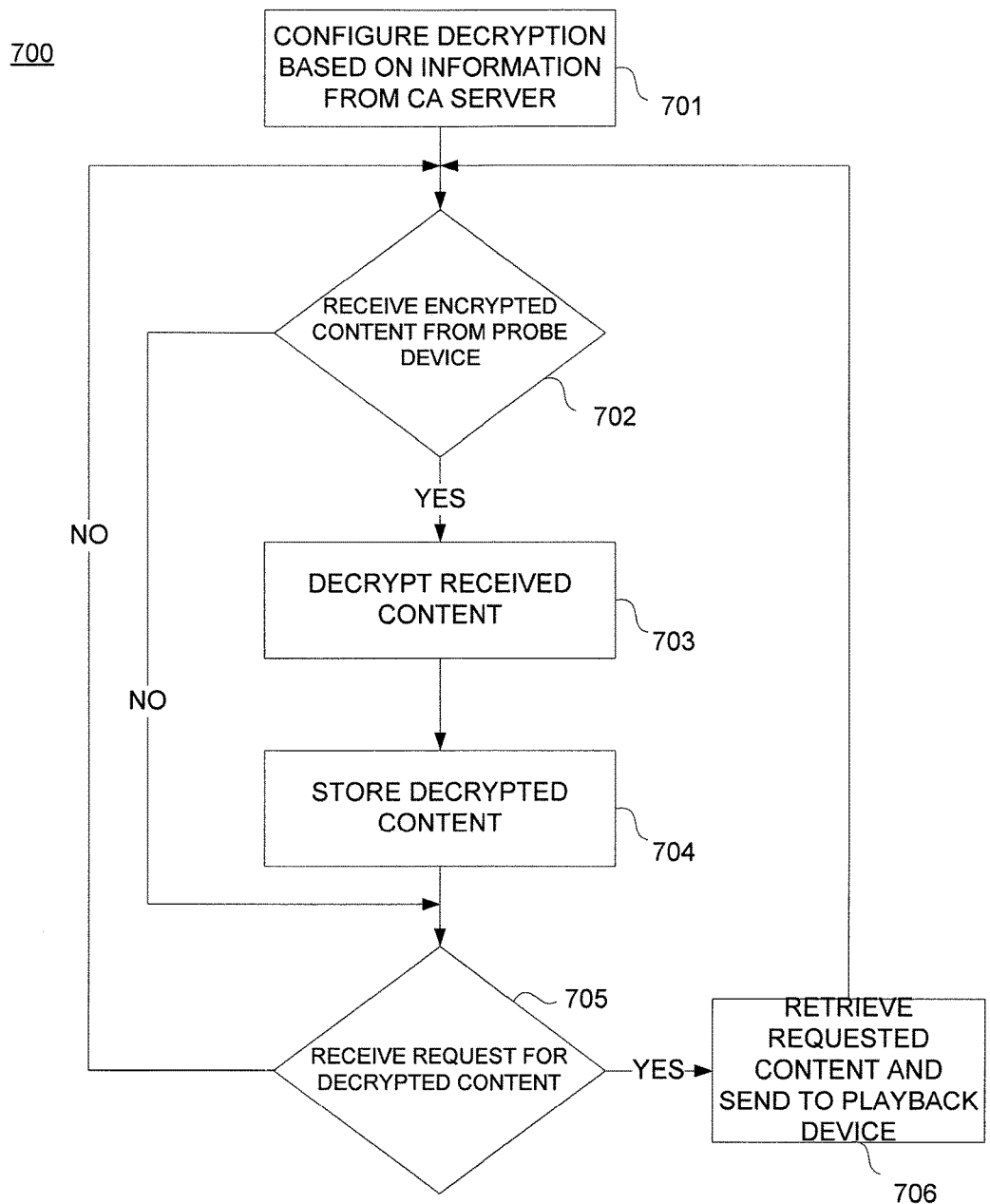
FIG. 7 shows a flow chart for a process performed at a decrypting device in accordance with some aspects of the disclosure.

FIG. 7 shows flow chart 700 for an example process performed at a decrypting device (e.g., device 216) in accordance with aspects of the disclosure. The decrypting device is configured at step 701 so that the decrypting device is able to encrypt content, for example, in accordance with the encryption scheme for distribution system 200. For example, CA server 214 may provide decrypting device 216 with the current decryption key so that the decrypting device can decrypt encrypted content. With some embodiments, the decrypting device may support a plurality of encryption schemes (e.g., when distribution system 200 supports different types of gateways, user devices, or when the decrypting device supports different distribution systems).

At steps 702-703 when the decrypting device receives encrypted content, the decrypting device decrypts the encrypted content at step 703 and stores the decrypted content in media storage at step 704. The decrypted content can be subsequently retrieved at step 706 if requested by a playback device at step 705.

Figure 8:
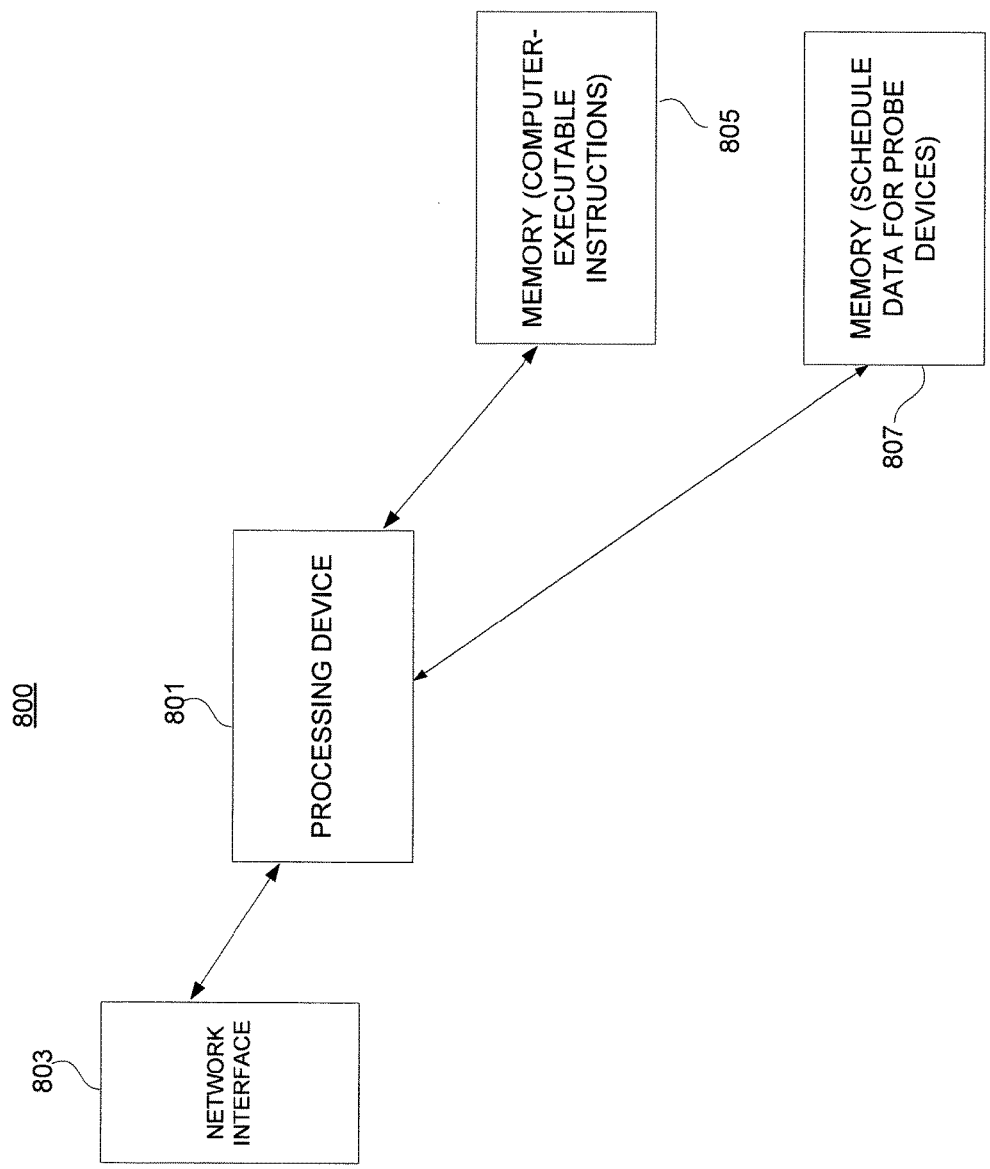
FIG. 8 shows an apparatus that supports a probe controller in accordance with some aspects of the disclosure.

FIG. 8 shows an example apparatus 800 that supports probe controller 220 in accordance with some aspects of the disclosure. With some embodiments, apparatus 800 supports the functionalities shown in flow chart 500 as shown in FIG. 5, and other functionalities. Processing device 801 may execute computer executable instructions from a computer-readable medium, e.g., memory 805, in order to perform a decryption process. Computer storage media may be any type including volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processing device 801. The executable instructions may carry out any or all of the method steps described herein. With some embodiments, processing device 801 may comprise one or more processing devices.

Probe controller apparatus 800 may instruct a probe device to capture selected encrypted content, or data representative of such content, based on schedule data stored in memory 807 or other parameters. The schedule data may include scheduled times, tuning information, content information, and the identification of the probe device (e.g., the assigned IP address) so that instructions can be routed to the appropriate probe device through network interface 803.

FIG. 9 shows an example apparatus 900 that supports probe/playback device 209 in accordance with some aspects of the disclosure. With some embodiments, apparatus 900 supports the functionalities shown in flow chart 600 as shown in FIG. 6, and other functionalities. Processing device 901 may execute computer executable instructions from a computer-readable medium, e.g., memory 907, in order to perform a decryption process. Computer storage media may include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processing device 901. The executable instructions may carry out any or all of the method steps described herein. With some embodiments, processing device 901 may comprise one or more processing devices.

Processing device 901 configures tuner 911 (e.g., channel number, PIDs, start time, and end time) to extract encrypted content based on schedule information received from the probe controller through network interface 903 and stored in memory 909. The captured content may be stored in media storage 905 and subsequently retrieved to that the captured encrypted content can be sent to a decrypting device through network interface 903.

Decrypted content may be later retrieved from the decrypting device through network interface 903 and displayed on display device 913 for verification.

Figure 10:
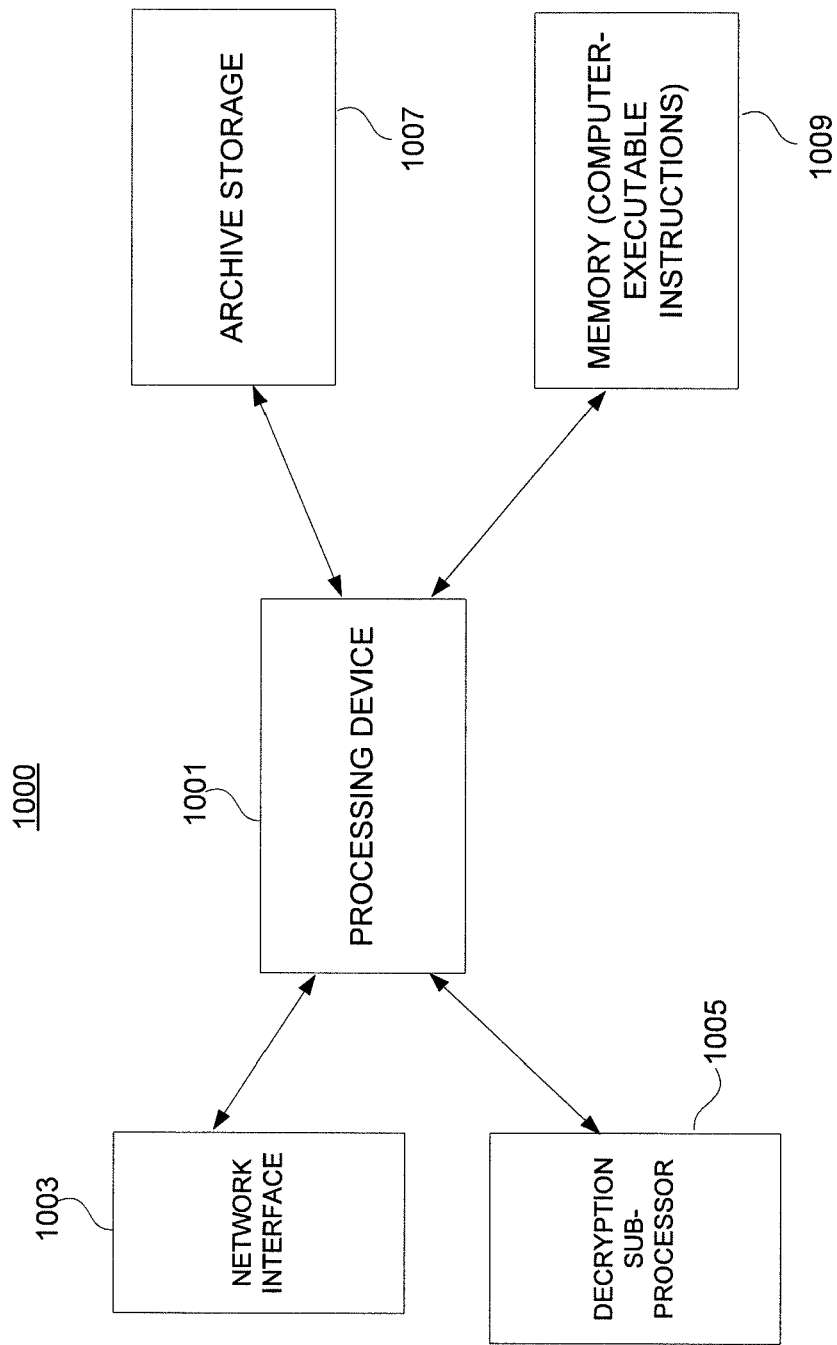
FIG. 10 shows an apparatus that supports a decrypting device in accordance with some aspects of the disclosure.

FIG. 10 shows an example apparatus 1000 that supports decrypting device 216 or 218 in accordance with some aspects of the disclosure. With some embodiments, apparatus 1000 supports the functionalities shown in flow chart 700 as shown in FIG. 7 and other functionalities. Processing device 1001 may execute computer executable instructions from a computer-readable medium, e.g., memory 1009 in order to perform a decryption process. Computer storage media may include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processing device 1001. The executable instructions may carry out any or all of the method steps described herein. With some embodiments, processing device 1001 may comprise one or more processing devices.

With some embodiments, sub-processor 1005, alone or in conjunction with processing device 1001, supports decrypting functionality. Archive storage 1007 may archive captured media content (corresponding with the functionality of archive database 217 for example). However, some embodiments may archive media content through a separate entity (not explicitly shown).

While the exemplary embodiments have been discussed, the disclosure may be configured for other devices, implementations, and/or networking environments.

I claim:

1. An apparatus comprising:
   at least one processor; and
   at least one memory having stored therein machine executable instructions, the at least one memory and stored instructions configured to, with the at least one processor, cause the apparatus to:
   receive instructions from a first device for capturing a scheduled transmission, wherein the scheduled transmission comprises encrypted content;
   based on the instructions, capture first encrypted content, wherein the first encrypted content is received from a second device via a network;
   send the first encrypted content to a third device to be decrypted, wherein the third device is remotely located from the apparatus;
   retrieve first decrypted content from the third device, wherein the first decrypted content comprises a decrypted representation of the first encrypted content; and
   verify the scheduled transmission by comparing the first decrypted content to expected content.

2. The apparatus of claim 1, wherein the at least one memory and the stored instructions further cause the apparatus to:
   output, for display, the first decrypted content.

3. The apparatus of claim 1, wherein the instructions from the first device enable capture of the first encrypted content in accordance with schedule information.

4. The apparatus of claim 3, wherein the capture of the first encrypted content comprises capture of the first encrypted content in accordance with the schedule information.

5. The apparatus of claim 1, wherein the at least one memory and the stored instructions further cause the apparatus to:
   verify the scheduled transmission by determining that the first encrypted content comprises an expected size and was captured within a scheduled time duration.

6. The apparatus of claim 1, wherein the received instructions specify a channel or a packet identifier (PID) for use in the capture of the first encrypted content.

7. The apparatus of claim 1, wherein the scheduled transmission comprises an advertisement or video on demand (VOD) content.

8. The apparatus of claim 1, wherein the first encrypted content is sent to the third device with instructions to cause decrypting of the first encrypted content.

9. An apparatus comprising:
   at least one processor; and
   at least one memory having stored therein machine executable instructions, the at least one memory and stored instructions configured to, with the at least one processor, cause the apparatus to:
   receive instructions from a first device for capturing a scheduled transmission, wherein the scheduled transmission comprises encrypted content;
   capture first encrypted content received from a second device via a network;
   send the first encrypted content to a third device to be decrypted;
   retrieve first decrypted content from the third device, wherein the first decrypted content comprises a decrypted representation of the first encrypted content; and
   verify the scheduled transmission by outputting, for display, at least a portion of the first decrypted content.

10. The apparatus of claim 9, wherein the at least one memory and the stored instructions further cause the apparatus to:
    store the first encrypted content; and
    capture second encrypted content received from the second device,
    wherein the first encrypted content is sent responsive to the capture of the second encrypted content and the stored instructions further cause the apparatus to send the second encrypted content to the third device.

11. The apparatus of claim 9, wherein the at least one memory and the stored instructions further cause the apparatus to:
    verify the scheduled transmission by determining that the first encrypted content comprises an expected size and was captured within a scheduled time duration.

12. The apparatus of claim 9, wherein the received instructions specify a channel or a packet identifier (PID) for use in the capture of the first encrypted content.

13. The apparatus of claim 9, wherein the scheduled transmission comprises an advertisement or video on demand (VOD) content.

14. The apparatus of claim 9, wherein the first encrypted content is sent to the third device with instructions to cause decrypting of the first encrypted content.

15. A system comprising:
    a first computing device;
    a second computing device; and
    a third computing device,
    wherein the first computing device comprises one or more non-transitory computer readable media storing one or more computer-executable instructions that, when executed by the first computing device, cause the first computing device to:
    receive instructions from the second computing device for capturing a scheduled transmission, wherein the scheduled transmission comprises encrypted content;

based on the instructions, capture first encrypted content, wherein the first encrypted content is received from a fourth computing device via a network;

send the first encrypted content to the third computing device to be decrypted, wherein the third computing device is remotely located from first computing device;

retrieve first decrypted content from the third computing device, wherein the first decrypted content comprises a decrypted representation of the first encrypted content; and verify the scheduled transmission by comparing the first decrypted content to expected content.

16. The system of claim 15, wherein the one or more non-transitory computer readable media storing the one or more computer-executable instructions, when executed by the first computing device, further cause the first computing device to:

verify the scheduled transmission by determining that the first encrypted content comprises an expected size and was captured within a scheduled time duration.

17. The system of claim 15, wherein the one or more non-transitory computer readable media storing the one or more computer-executable instructions, when executed by the first computing device, further cause the first computing device to:

output, for display, the first decrypted content.

18. The system of claim 15, wherein the one or more non-transitory computer readable media storing the one or more computer-executable instructions, when executed by the first computing device, further cause the first computing device to:

store the first encrypted content; and capture second encrypted content received from the fourth computing device, wherein the first encrypted content is sent responsive to the capture of the second encrypted content and the one or more computer-executable instructions, when executed by the first computing device, cause the first computing device to send the second encrypted content to the third computing device.

19. The system of claim 15, wherein the one or more non-transitory computer readable media storing the one or more computer-executable instructions, when executed by the first computing device, further cause the first computing device to:

send instructions to the third computing device to cause decrypting of the first encrypted content.

20. The system of claim 15, wherein the first computing device, the second computing device and the third computing device are components in a hybrid fiber coaxial cable (HFC) access network.

* * * * *

UNITED STATES PATENT AND TRADEMARK OFFICE
CERTIFICATE OF CORRECTION

PATENT NO.         : 9,838,364 B2                                  Page 1 of 1
APPLICATION NO.    : 15/202791
DATED              : December 5, 2017
INVENTOR(S)        : Maurice Garcia It is certified that error appears in the above-identified patent and that said Letters Patent is hereby corrected as shown below:

In the Specification

Column 1, Line 23:
Please delete "interne" and insert --internet--

Column 3, Line 16:
Delete "settop" and insert --set-top--

Column 6, Line 5:
Before "FIG. 4", delete "38"

Signed and Sealed this
Second Day of April, 2019

Andrei Iancu
*Director of the United States Patent and Trademark Office*